United States Patent
Herzog et al.

(10) Patent No.: US 12,031,557 B2
(45) Date of Patent: Jul. 9, 2024

(54) PNEUMATIC CONTROL DEVICE

(71) Applicant: Festo SE & Co. KG, Esslingen (DE)

(72) Inventors: Andreas Herzog, Köngen (DE); Timo Dreesmann, Dettingen unter Teck (DE)

(73) Assignee: Festo SE & Co. KG, Esslingen (DE)

( * ) Notice: Subject to any disclaimer, the term of this patent is extended or adjusted under 35 U.S.C. 154(b) by 429 days.

(21) Appl. No.: 17/442,401

(22) PCT Filed: Mar. 10, 2020

(86) PCT No.: PCT/EP2020/056310
§ 371 (c)(1),
(2) Date: Sep. 23, 2021

(87) PCT Pub. No.: WO2020/193114
PCT Pub. Date: Oct. 1, 2020

(65) Prior Publication Data
US 2022/0197250 A1  Jun. 23, 2022

(30) Foreign Application Priority Data

Mar. 25, 2019 (DE) .......................... 102019203999.5

(51) Int. Cl.
*F15B 13/08* (2006.01)
(52) U.S. Cl.
CPC ...... *F15B 13/0889* (2013.01); *F15B 13/0857* (2013.01); *F15B 13/0867* (2013.01)
(58) Field of Classification Search
CPC .............. F15B 13/0889; F15B 13/0857; F15B 13/0867

USPC .......................................................... 361/728
See application file for complete search history.

(56) References Cited

U.S. PATENT DOCUMENTS 6,173,731 B1 * 1/2001 Ottliczky ............ F15B 13/0867
137/271
2018/0023718 A1   1/2018 De Carolis et al.

FOREIGN PATENT DOCUMENTS

| DE | 19653714 | 12/1997 |
|---|---|---|
| DE | 19653714 C1 | 12/1997 |
| DE | 202005015791 | 1/2006 |
| DE | 202005015791 U1 | 1/2006 |
| DE | 102016213725 | 2/2018 |
| DE | 102016213725 A1 | 2/2018 |
| EP | 2201586 | 7/2010 |

(Continued)

*Primary Examiner* — Binh B Tran
(74) *Attorney, Agent, or Firm* — Hoffmann & Baron, LLP

(57) ABSTRACT

A pneumatic control including a bus node, which is equipped with a first type communication interface and with a first type supply interface, further including a coupling module, which is equipped with the first type communication interface and with the first type supply interface and with a second type communication interface and a second type supply interface, and further including a valve module which is equipped on both coupling surfaces with the second type communication interface and with the second type supply interface, wherein a connection module is connected with the valve module, which connection module is equipped at a first coupling surface with the second type communication interface and with the second type supply interface, and which connection module is equipped at a second coupling surface with the first type communication interface and the first type supply interface.

8 Claims, 2 Drawing Sheets

(56) References Cited

FOREIGN PATENT DOCUMENTS

EP 2201586 A1 7/2010

* cited by examiner

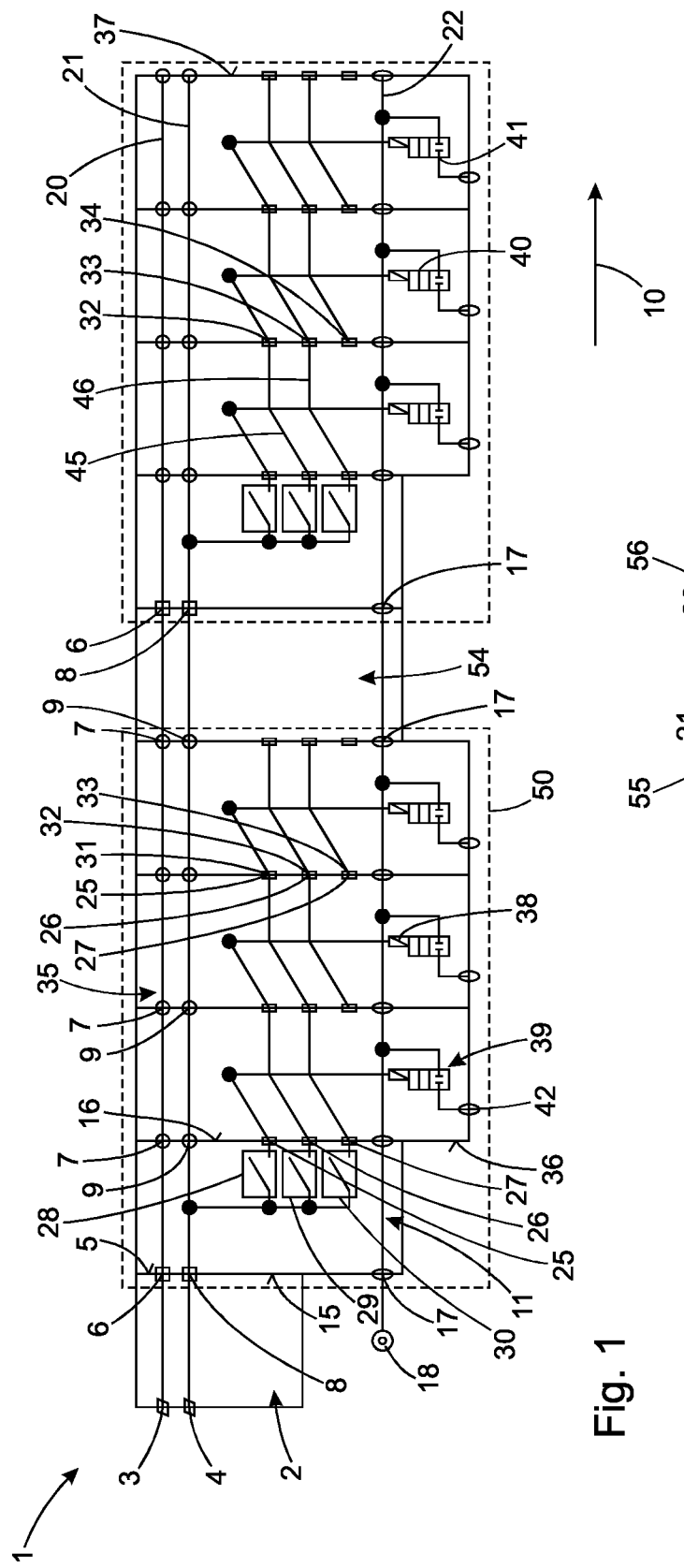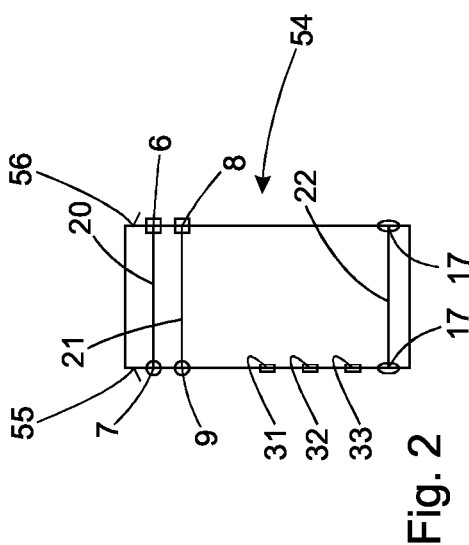

PNEUMATIC CONTROL DEVICE

This is a National Stage application based on International Application No. PCT/EP2020/056310, filed on Mar. 10, 2020, which claims priority to DE 102019203999.5, filed Mar. 25, 2019.

BACKGROUND OF THE INVENTION

The invention relates to a pneumatic control, comprising a bus node which is equipped at a coupling surface with a first type communication interface and with a first type supply interface, further comprising a coupling module which is equipped at a first coupling surface with the first type communication interface and with the first type supply interface and which is equipped at a second coupling surface with a second type communication interface and with a second type supply interface, and further comprising a valve module which is equipped at a first coupling surface and at a second coupling surface with the second type communication interface and with the second type supply interface, respectively, wherein the coupling module is attached to the bus node and wherein the valve module is attached to the coupling module.

A series module for a modular control arrangement is known from DE 10 2016 213 725 A1, which comprises a first series interface and a first bus interface and a second series interface and a second bus interface, wherein a bus communication line is formed between the two bus interfaces and a plurality of connecting lines are formed between the two series interfaces, and wherein the connecting lines are arranged at least partially Z-interlinked between the two series interfaces.

SUMMARY OF THE INVENTION

The task of the invention is to provide a functional extension for a pneumatic control. According to the invention it is provided that a connection module is connected with the valve module, which connection module is equipped on a first coupling surface with the second type communication interface and with the second type supply interface and which connection module is equipped on a second coupling surface with the first type communication interface and with the first type supply interface, in order to enable a coupling of a further coupling module and a further valve module.

With such a connection module, line-up of a further coupling module as well as at least one further valve module in a predetermined line-up direction to a preceding valve module is enabled. Here it is assumed that each of the valve modules used is equipped with the second type communication interface and with the second type supply interface on its first coupling surface as well as on its second coupling surface. In this case, it is not possible to couple a standard coupling module, whose first coupling surface is equipped with the first to type communication interface and with the first type supply interface to the preceding valve module in the line-up direction without interposing a suitably designed connection module. Rather, the coupling module is designed for coupling to the preceding bus node in the line-up direction, whereby the coupling surface of the bus node is equipped with the first type communication interface and with the first type supply interface.

The connection module serving as an adapter between the valve module preceding in the line-up direction and the coupling module to be coupled therefore presents itself in the way of a further valve module in relation to the valve module preceding in the line-up direction. For this purpose, the connection module is equipped at its first coupling surface with the second type communication interface and with the second type supply interface, which are compatible with the second type communication interface and with the second type supply interface of the valve module, which is arranged preceding in the line-up direction. Furthermore, the connection module comprises at its second coupling surface the first type communication interface and the first type supply interface as required for a downstream coupling of the coupling module in the line-up direction. The coupling module enables a forwarding of the bus protocol transmitted via the first type communication interface and the second type communication interface as well as a forwarding of the electrical energy transmitted via the first type supply interface and the second type supply interface to at least one further coupling module, to which further valve modules can be assigned, which can be electrically supplied and controlled in this way.

In principle, it can be assumed that at least one valve module, preferably two valve modules, in particular three valve modules, are lined up on a coupling module in the line-up direction for the pneumatic control and can be electrically supplied and controlled accordingly. With the aid of the connection module, a module group, which can be formed from a coupling module and up to three valve modules, can be connected to another module group, comprising a coupling module and one, two or three valve modules, without further measures being required on the pneumatic control and on its components, such as the bus nodes, the coupling modules or the valve modules, in addition to the provision of the connection module.

Advantageous further embodiments of the invention are the subject of the subclaims.

It is expedient if the coupling module has on the second coupling surface a plurality of, in particular three, output interfaces which are electrically connected to the first supply interface and to each of which a switch is assigned for safety-related disconnection of the respectively assigned output interface and which are designed for coupling to input interfaces of the valve module. The task of the output interfaces is to enable an individual electrical supply of the valve modules arranged downstream of the coupling module. This individual electrical supply to the valve modules is in addition to the electrical supply that is provided to all components of the pneumatic control via the respectively assigned first type supply interfaces and the second type supply interfaces.

It is provided that a switch, for example a relay or an electronic semiconductor switch, is arranged between the first type supply interface, at which electrical energy is supplied to the coupling module, and the respective output interface of the coupling module. With this switch, the coupling module can perform an individual electrical supply of the respectively assigned valve module in dependence on a control signal transmitted via the communication line extending through all components of the pneumatic control using the first type communication interfaces and the second type communication interfaces. Therefore, the coupling module serves as a safety-related shutdown module for the connected valve modules, so that they can be considered as part of a safety-related architecture for the pneumatic control.

In an alternative embodiment of the invention, it is provided that the coupling module has a plurality of output interfaces, in particular three output interfaces, which are electrically connected to the first type supply interface and to each of which a switch is assigned for safety-related disconnection of the respectively assigned output interface, wherein one of the output interfaces is arranged on a connection surface of the coupling module and is designed for a connection with an external consumer, and wherein the other output interfaces are arranged on the second coupling surface of the coupling module and are designed for a coupling with input interfaces of the valve module. In this alternative embodiment of the coupling module, one of the three output interfaces serves for a connection with an external consumer, for example an electric motor, while the other two output interfaces are designed for the electrical supply of valve modules arranged downstream.

In an advantageous further development of the invention, it is provided that the valve module has a first input interface, a second input interface and a third input interface on the first coupling surface and a first output interface, a second output interface and a third output interface on the second coupling surface, wherein the first input interface is electrically connected to a consumer in the valve module and wherein the second input interface is electrically connected to the first output interface and wherein the third input interface is electrically connected to the second output interface.

By such an electrical coupling of the input interfaces with the respectively assigned output interfaces, a so-called Z-linking is realized, in which an electrical consumer contained in the valve module is always connected to the first input interface, while the electrical supply voltages provided at the two further input interfaces can be provided to the first and the second output interface. This ensures an unambiguous assignment of the electrical supply voltages provided at the input interfaces to the respective consumers of the valve modules, which are preferably arranged in series.

Preferably, it is provided that the input interfaces and the output interfaces are arranged at a predetermined mechanical pitch on the respective coupling surfaces in order to always achieve the desired electrical coupling between the output interfaces of the preceding valve module and the input interfaces of the following valve module when the valve modules are lined up in the line-up direction.

Preferably, it is provided that the connection module has several input interfaces at the first coupling surface, which are designed for coupling with the output interfaces of the valve module. This ensures an advantageous electromechanical coupling between the connection module and the valve module arranged in advance along the line-up direction. In this case, no output interfaces on the connection module are assigned to the input interfaces on the connection module. For valve modules arranged downstream of the connection module in the line-up direction, the individually switchable supply lines are provided by the coupling module arranged downstream of the connection module at respective output interfaces of to the connection module and are therefore independent of the supply voltages of the preceding valve module or module group.

It is advantageous if electrical connections between the second type communication interface and the first type communication interface and electrical connections between the second type supply interface and the first type supply interface are formed in the connection module. This ensures that a coupling module arranged downstream of the connection module in the line-up direction an be supplied with the same electrical signals with regard to communication and electrical supply as is the case for the coupling module directly connected to the bus node. Accordingly, a second coupling module or a further coupling module which is lined up within the pneumatic control can realize the same functionality as is the case for the coupling module directly coupled to the bus node.

In a further embodiment of the invention, it is provided that electrical connections between the second type communication interface and the first type communication interface is formed in the connection module and that the connection module comprises a supply interface which is electrically connected to the first type supply interface. In this alternative embodiment of the connection module, the communication signals provided by the preceding valve module via the communication interfaces are forwarded unchanged to the downstream coupling module and the valve modules attached thereto. The electrical supply to the downstream coupling module and to the downstream valve module is provided via an externally supplied electrical voltage that is connected to the supply interface of the connection module. In this way, different voltage zones can be realized within a pneumatic control by means of the connection module. Alternatively, the supply interface also enables an intermediate supply of an electrical voltage in order to be able to supply sufficient electrical power to coupling modules and valve modules which are lined up downstream.

It is advantageous if a communication path is formed in the coupling module between the first type communication interface and the second type communication interface and a supply path is formed between the first type supply interface and the second type supply interface, and that a communication path is formed in the valve module between the second type communication interfaces and a supply path is formed between the second type supply interfaces.

BRIEF DESCRIPTION OF THE DRAWINGS

Advantageous embodiments of the invention are shown in the drawing. Here shows:

FIG. 1 a first embodiment of a pneumatic control with a bus node to which a first module group, a connection module and a second module group are connected, FIG. 2 a detailed representation of the connection module according to FIG. 1, FIG. 3 a second embodiment of a pneumatic control with the bus node and the first module group and the second module group according to FIG. 1 and a modified connection module, and FIG. 4 a detailed representation of the connection module according to FIG. 3. In the following description of the figures, for reasons of clarity, components that are present several times are generally only given the respective reference sign once, whereby the arrangement of the reference signs on the components does not necessarily correspond to the component described in detail in each case.

DETAILED DESCRIPTION

Figure 3:
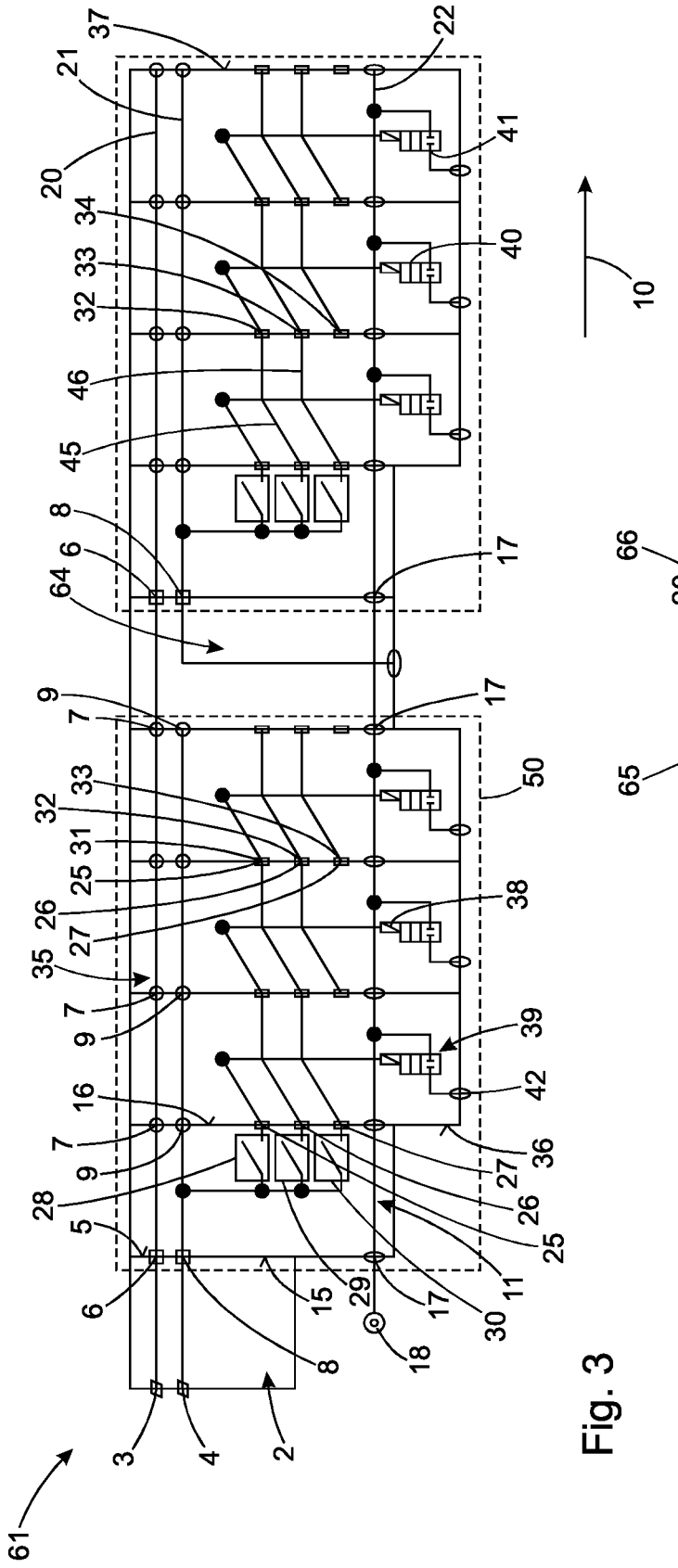
Figure 4:
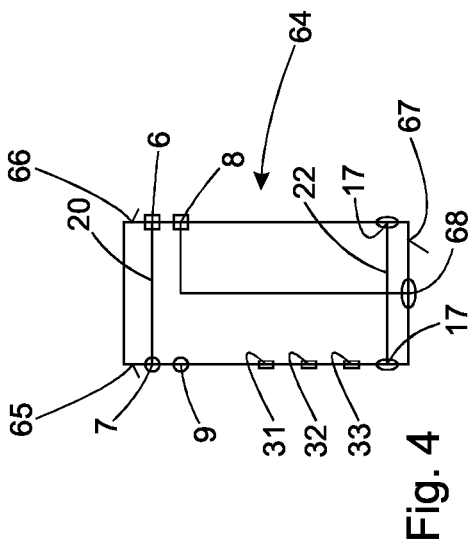

A pneumatic control 1 shown in FIG. 1 is designed to supply several fluid consumers, in particular pneumatic cylinders, which are not shown, with compressed air. The pneumatic control 1 can be used, for example, for the operation of a production machine not shown, in which, during the execution of a production process, workpieces have to be fixed and/or transported, which can be performed by means of pneumatic actuators such as pneumatic cylinders. These pneumatic actuators are each supplied with compressed air by the pneumatic control.

Exemplarily, it is provided that the pneumatic control 1 is connected to a control system not shown, in particular a programmable logic controller (PLC), which provides control signals to the pneumatic control 1 via a predetermined communication protocol. For this purpose, the pneumatic control 1 comprises a bus node 2, which is equipped with a bus interface 3, which is designed for receiving control signals from the higher-level control system and for forwarding these control signals to components arranged downstream and described in more detail below.

Preferably, it is provided that a conversion of the control signals provided by the higher-level control system at the bus interface 3 into a proprietary communication protocol is carried out in the bus node 2. The converted control signals are then provided to the downstream components of the pneumatic control 1. This proprietary communication protocol can be, for example, a proprietary digital bus protocol or, alternatively, digital or analog control signals that are provided to the downstream components of the pneumatic control 1 via individual control signal lines (of a multi-pole line arrangement) that are not shown in more detail.

Furthermore, a supply connection 4 is formed at the bus node 2, which is designed for coupling in electrical energy from a supply source not shown in more detail. The electrical energy fed in at the supply connection 4 is intended both for supplying the bus node 2 and for forwarding to the components of the pneumatic control 1 described in more detail below.

A first type communication interface 6 and a first type supply interface 8 are formed on a coupling surface 5 of the bus node 2, wherein the communication signal fed into and converted at the bus interface 3 is provided to the first type communication interface 6, while the electrical supply voltage fed into the supply connection 4 is provided to the first type supply interface 8.

A coupling module 11 is aligned in a line-up direction oriented to the right and adjacent to the bus node 2 and rests with a first coupling surface 15 against the coupling surface 5 of the bus node 2. Furthermore, the coupling module 11 has a second coupling surface 16, which is oriented away from the bus node 2. The first type communication interface 6 and the first type supply interface 8 of the coupling module are formed at the first coupling surface 15. The second type communication interface 7 as well as the second type supply interface 9 is formed at the second coupling surface 16 of the coupling module 11. Starting from the first type communication interface 6, a communication line 20 extends through the coupling module 11 to the second type communication interface 7. Furthermore, starting from the first type supply interface 8 of the coupling module 11, a supply line 21 extends to the second type supply interface 9, which is formed at the second coupling surface 16 of the coupling module 11.

For the pneumatic control 1, it is assumed that interfaces designated in the same manner can each be electrically and mechanically coupled to each other. For example, the first type communication interface 6 of the bus node 2 and the first type communication interface 6 of the coupling module 11 can each be formed as elastic contact elements slightly protruding from the respective coupling surface 5, 15, respectively, in order to ensure the desired electrical coupling between the bus node 2 and the coupling module 11 with respect to the first type communication interface 6.

Furthermore, the coupling module 11 comprises a pneumatic interface 17 at the first coupling surface 15, which is designed to feed compressed air into the pneumatic control 1 and which is connected to a compressed air source 18 shown only schematically. Starting from the pneumatic interface 17, a pneumatic line 22 extends to a pneumatic interface 17 at the second coupling surface 16 of the coupling module 11.

The coupling module 11 further comprises, by way of example, three output interfaces 25, 26 and 27 which are associated with the second coupling surface 16 and which are electrically connectable to the supply line 21 via respective associated switches 28, 29, 30 which are shown only schematically. By way of example, it is provided that the first switch 28, the second switch 29 and the third switch 30 are each designed as semiconductor switches. These switches 28, 29 30 are controlled by a processor of the coupling module 11, which is not shown in more detail and which is also connected to the communication line 20 in a manner not shown in more detail, in order to be able to convert control commands into corresponding switching signals for the switches 28 to 30. Accordingly, the supply line 21, the switches 28 to 30 and the output interfaces 25 to 27 can be used to selectively provide electrical energy to a valve module 35 arranged downstream of the coupling module 11.

The valve module 35 comprises both at a first coupling surface 36 facing the coupling module 11 and at a second coupling surface 37 facing away from the coupling module 11, the second type communication interface 7 and the second type supply interface 9, respectively. Furthermore, at the first coupling surface 36, the valve module 35 comprises, for example, three input interfaces 31, 32 and 33, which are designed for electrical connection to the associated output interfaces 25, 26 and 27 of the coupling module 11. In addition, the valve module 35 comprises at the second coupling surface the output interfaces 25, 26 and 27 formed correspondingly to the coupling module 11. In addition, the supply line 21 extends in the valve module 35 from the pneumatic interface 17 at the first coupling surface 36 to the pneumatic interface 17 at the second coupling surface 37.

The valve module 35 comprises a solenoid 38, which is electrically connected to the first input interface 31. The solenoid 38 is used for electromechanical actuation of a switching valve 39, for example a 2/2-way valve, and whose input port 40 is connected to the pneumatic line 22 and whose output port 41 is connected to a working port 42. Accordingly, when an electrical supply voltage is provided at the first input interface 31 of the valve module 35, the solenoid 38 can be activated to move the switching valve 39 from a first functional position, in particular a closed position, to a second functional position, in particular an open position. In the open position, a communicating connection is established between the pneumatic line 22 and the working connection 42, so that a pneumatic consumer, which is not shown in more detail and which is connected to the working connection 42, can be supplied with compressed air.

For an advantageous forwarding of the electrical supply voltages, which are provided at the output interfaces 26 and 27 of the coupling module 11, two connection lines 45 and 46 are formed in the valve module 35 in a purely exemplary manner. The connection line 45 is designed for an electrical connection of the second input interface 32 with the first output interface 25 of the valve module 35. The connection line 46 is designed for an electrical connection of the third input interface 33 with the second output interface 26 of the valve module 35. This establishes a Z-connection between the second input interface 32 and the first output interface 25 and between the third input interface 33 and the second output interface 26 in the valve module 35, by means of which a defined forwarding of the supply voltages applied to the input interfaces 32 and 33 to downstream valve modules 35 is made possible, as can also be seen from the illustration in FIG. 1.

By way of example, two further valve modules 35 of identical design are connected to the valve module 35, which is directly connected to the coupling module 11, whereby the three valve modules 35 together with the coupling module 11 form a module group 50. Due to the design of the valve modules 35 and the number of switches 28 to 30 in the coupling module 11, it results that the three valve modules 35 can be supplied with specifically switchable supply voltages via the respectively assigned input interfaces 31 to 33 within the module group 50.

If a further valve module 35 is added to the module group 50, it would be connected to the preceding coupling module 11 exclusively via the communication line 20, the supply line 21 and the pneumatic line 22. On the other hand, a direct influence from the coupling module 11 on this valve module 35 by means of the switches 28, 29, and 30 would be excluded in this case.

If it is intended to connect another module group 50, in particular an identically designed module group 50, to the module group 50, a connection module 54 is provided. A first coupling surface 55 of the connection module 54 is in direct contact with the second coupling surface 37 of the valve module 35. The connection module 54 provides a second coupling surface 56 for coupling a further coupling module 11. For this purpose, the second type communication interface 7 and the second type supply interface 9 are formed on the first coupling surface 55, so that the connection module 54 is like another valve module 35 with respect to the valve module 35. On the other hand, the first type communication interface 6 and the first type supply interface 8 are assigned to the second coupling surface 56, so that the connection module 54 is like a bus node 2 from an electromechanical point of view in relation to the coupling module 11 to be added subsequently.

Exemplarily, it is provided that three input interfaces 31 to 33 are formed at the first coupling surface 55, which are not further connected within the connection module 54 and which correspond to the output interfaces 25, 26 and 27 of the valve module 35. Rather, it is provided that only the second type communication interface 7 is electrically connected to the first type communication interface 6 via an associated communication line 20 and that the second type supply interface 9 is electrically connected to the first type supply interface 8 via an associated supply line 21. Furthermore, the connection module 54 is also equipped with pneumatic interfaces 17 at both coupling surfaces 55, 56, which are coupled to each other within the connection module 54 via a pneumatic line 22. A further coupling module 11 can be attached to the connection module 54 in accordance with its configuration of the second coupling surface 56 with the first type communication interface 6 and the first type supply interface 8, which in turn can be coupled with further valve modules 35 arranged in the direction of arrangement 10 to form a further module group 50.

In this case, it is provided that control signals can be transmitted from bus node 2 to both module groups 50 via the first type communication interface 6 and the second type communication interface 7 and the communication lines 20, respectively, and can be used there for selective control of the individual valve modules 35, respectively.

The pneumatic control 61 shown in FIG. 3 differs from the pneumatic control 1 according to FIG. 1 only by a differently designed connection module 64, whose first coupling surface 65 is provided with a second type communication interface 7 and with a pneumatic interface 17. A second coupling surface 66 of the connection module 64 is equipped with a first type communication interface 6 and with a first type supply interface 8. For a supply of electrical energy to the first supply interface 8, a supply interface 68 is formed at a connection surface 67 of the connection module 64. This makes it possible to feed electrical energy to the coupling module 11 arranged downstream in the line-up direction 10 independently of the bus node 2 arranged upstream. This allows that the valve modules 35, which are attached to the downstream coupling module 11, are to be supplied with a different supply voltage than the preceding module group 50, which is supplied via the bus node 2.

In the case of the connection module 64, a pneumatic line 22 is provided corresponding to the connection module 54, which extends between pneumatic interfaces 17 at the first coupling surface 65 and the second coupling surface 66.

In an embodiment of a coupling module not shown, one of the switches 28 to 30 is not connected to one of the output interfaces 25 to 27 but to an additional connection interface which is not arranged on a coupling surface but on a connection surface which is freely accessible even in the coupled state of the coupling module, as a result of which the correspondingly modified coupling module can carry out direct control of an electrical consumer which is not designed as a valve module.

The invention claimed is:

1. A pneumatic control, comprising a bus node which is equipped at a bus node coupling surface with a first type communication interface and with a first type supply interface, further comprising a coupling module which is equipped at a first coupling module coupling surface with the first type communication interface and with the first type supply interface and at a second coupling module coupling surface with a second type communication interface and with a second type supply interface, and further comprising a valve module which is equipped at a first valve module coupling surface with the second type communication interface and with the second type supply interface and at a second valve module coupling surface with the second type communication interface and with the second type supply interface, the coupling module being connected to the bus node and the valve module being connected to the coupling module, wherein a connection module is connected with the valve module, which is equipped at a first connection module coupling surface with the second type communication interface and with the second type supply interface and which is equipped at a second connection module coupling surface with the first type communication interface and with the first type supply interface.

2. The pneumatic control according to claim 1, wherein the coupling module has on the second coupling module coupling surface a plurality of output interfaces which are electrically connected to the first type supply interface and to each of which a switch for safety-related disconnection of the respectively assigned output interface and which are designed for coupling to input interfaces of the valve module.

3. The pneumatic control according to claim 1, wherein the coupling module has a plurality of output interfaces which are electrically connected to the first type supply interface and to each of which a switch is assigned for safety-related disconnection of the respectively assigned output interface, one of the output interfaces being arranged on a connection surface of the coupling module and being designed for connection of an external consumer, and the other output interfaces being arranged on the second coupling module coupling surface of the coupling module and being designed for coupling to input interfaces of the valve module.

4. The pneumatic control according to claim 2, wherein the valve module has, at the first valve module coupling surface, a first input interface, a second input interface and a third input interface and, at the second valve module coupling surface, a first output interface, a second output interface and a third output interface, wherein the first input interface is electrically connected to a consumer in the valve module and wherein the second input interface is electrically connected to the first output interface and wherein the third input interface is electrically connected to the second output interface.

5. The pneumatic control according to claim 2, wherein the connection module has a plurality of input interfaces on the first connection module coupling surface, which are designed for coupling to the output interfaces of the valve module.

6. The pneumatic control according to claim 1, wherein an electrical connection between the second type communication interface and the first type communication interface and an electrical connection between the second type supply interface and the first type supply interface are formed in the connection module.

7. The pneumatic control according to claim 1, wherein an electrical connection between the second type communication interface and the first type communication interface is formed in the connection module, and in that the connection module has a supply interface which is electrically connected to the first type supply interface.

8. The pneumatic control according to claim 1, wherein a communication path is formed in the coupling module between the first type communication interface and the second type communication interface and a supply path is formed between the first type supply interface and the second type supply interface, and in that a communication path is formed in the valve module between the second type communication interfaces and a supply path is formed between the second type supply interfaces.

* * * * *